Patented Dec. 20, 1938

2,140,495

UNITED STATES PATENT OFFICE 2,140,495

BIS(2,3-HYDROXY-NAPHTHOYL-M-AMINOPHENYL) UREA

Samuel Coffey, Manchester, and John Edgar Schofield, Huddersfield, England, assignors to Imperial Chemical Industries Limited, a corporation of Great Britain No Drawing. Original application March 26, 1932, Serial No. 601,454, now Patent No. 2,093,265, dated September 14, 1937. Divided and this application November 11, 1936, Serial No. 110,276. In Great Britain March 31, 1931

1 Claim. (Cl. 260—553)

This invention relates to novel N,N'-diarylureas and a process for the production thereof, this application being a division of our copending application Serial No. 601,454, filed March 26, 1932, now Patent No. 2,093,265, dated September 14, 1937.

As is well known, some N,N'-diarylureas are not readily obtained when the corresponding arylamines are treated with phosgene according to the general methods hitherto known. Paranitraniline, for example, does not readily give a carbonyl derivative by these means. Aniline itself, when treated with phosgene, gives only half its equivalent of diphenylurea, the remainder of the aniline being converted into aniline hydrochloride.

It is an object of the present invention to provide a new and improved process for the manufacture of N,N'-diarylureas. A further object is the provision of a process adapted to the production in a technically satisfactory way of N,N'-diarylureas from arylamines insoluble or sparingly soluble in water, or devoid of solubilizing groups. A still further and more specific object is the production of novel ureas from compounds of the general formula R—NH$_2$, wherein R is the residue of a compound adapted to be used as coupling component for azo dyestuffs. Further objects are the production of new chemical compounds and in general to advance the art. Other objects will appear hereinafter.

These objects are accomplished according to the invention whereby N,N'-diarylureas are obtained by treating a primary arylamine with phosgene in the presence of a tertiary base. This is preferably effected by passing gaseous phosgene into the primary arylamine dissolved in or mixed with the tertiary base. A liquid which is indifferent or does not affect the reaction unfavorably may be advantageously employed in an auxiliary capacity as a solvent, diluent, or suspension medium.

The invention will be further illustrated, but is not limited, by the following examples in which the parts are by weight:

Example I

Thirty parts of 2,3-hydroxynaphthoyl-m-amino-anilide are agitated at room temperature with 80 parts of toluene and 13 parts of dimethylaniline. Phosgene (8 parts) is passed in slowly over one hour, keeping the temperature below 40° C. The mixture is then heated to 90° C. for 4 hours, cooled and filtered, and the precipitate well washed with water and dried. The bis(2,3-hydroxynaphthoyl-3-aminophenyl) urea obtained melts at 275–282° C., and after solution in caustic soda and reprecipitation, at 286–289° C. The product is represented by the formula:

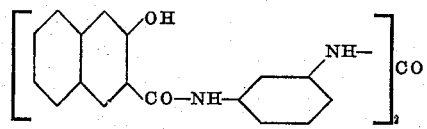

Example II

Fifty-five parts of 1-m-aminophenyl-3-methyl-5-pyrazolone hydrochloride containing 68.9% by weight of 1-m-amino-phenyl-3-methyl-5-pyrazolone (M. W. 189) are agitated with 260 parts of toluene and 45 parts of dimethyl-aniline and phosgene (12.5 parts) is passed in slowly at 15–30° C. over a period of two hours. The mixture is heated to 90° C. for two hours, cooled and the solid filtered off and washed with water containing hydrochloric acid. The solid is purified by solution in an excess of dilute aqueous sodium carbonate, filtration and reprecipitation with acid. After drying there is obtained about 35 parts of the urea having a melting point of 236–237° C. The urea is represented by the formula:

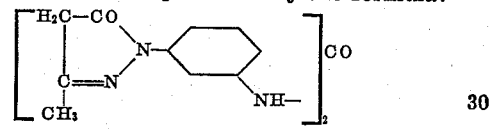

In the production of diarylureas in accordance with the present invention, the amine reacted upon with phosgene may be any primary arylamine. The hydrogen atoms in the ring nucleus of the arylamine may or may not be replaced by substituents such as, for example, halogen, nitro, alkyl, alkoxy, substituted amino derivatives (e. g., aryl or alkylacyl-amino), isocyclic and heterocyclic radicals. Mention may be made of the application of the process to the following specific compounds: paranitraniline, 1-m-aminophenyl-3-methyl-5-pyrazolone

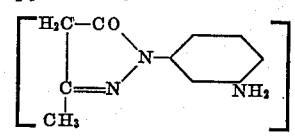

ortho-phenetidine, 2,3-hydroxynaphthoyl-m-aminoanilide

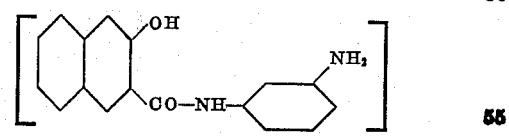

5-chloro-4-nitro-o-anisidine, 4-nitro-2,5-dimethoxyaniline

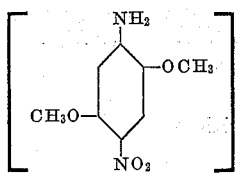

ortho-anisidine, 5-nitro-o-anisidine, benzylamine, ortho toluidine, meta-toluidine, alpha and beta naphthylamine and the xylidines.

The tertiary base may be any aliphatic and/or aryl basic tertiary amine. The amount thereof employed should preferably be at least sufficient to take up the hydrogen chloride liberated during the formation of the urea. As examples of tertiary bases may be mentioned dimethylaniline, triethanolamine, diethylaniline, diethylamino ethyl alcohol, trimethylene diamine, tripropylamine, methyl diethanol amine, tribenzylamine, nicotine

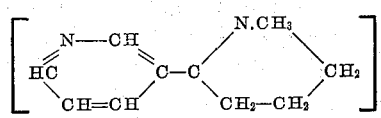

quinoline, and pyridine.

While it may not be necessary in every case to employ a solvent, suspension agent, or diluent in the reaction, this is generally desirable to render the reaction mixture more fluid, thereby facilitating stirring and increasing the smoothness of the reaction. The kind of solvent or suspension agent employed is subject to considerable variation depending largely upon the nature of the primary and tertiary amines employed. Generally speaking, we prefer to employ organic solvents. Such solvents are particularly advantageous where the amines are not water-soluble. Especially desirable results have been obtained with benzene, toluene, and ethylene dichloride as solvents.

The temperature at which the operation is performed is preferably that of the room, but a higher temperature may be necessary or desirable to accelerate the reaction.

The novel products of this invention are valuable in the chemical industry, more particularly for the production of azo dyes by coupling with diazo compounds in the same manner used to convert the 2,3-hydroxy-naphthoyl derivatives of U. S. Patent 1,987,669 and the diaryl ureas of U. S. Patent 656,646 into azo dyestuffs.

As many apparent and widely different embodiments of this invention may be made without departing from the spirit thereof, it is to be understood that we do not limit ourselves to the foregoing examples or description except as indicated in the following claim.

We claim:

The compound, bis(2,3-hydroxy-naphthoyl-m-aminophenyl) urea corresponding to the following formula

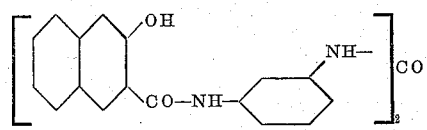

SAMUEL COFFEY.
JOHN EDGAR SCHOFIELD.